(12) United States Patent  (10) Patent No.: US 9,395,813 B2
Yoon et al.  (45) Date of Patent: Jul. 19, 2016

(54) METHOD FOR CONTROLLING OPERATION AND ELECTRONIC DEVICE THEREOF

(71) Applicant: Samsung Electronics Co., Ltd., Suwon-si, Gyeonggi-do (KR)

(72) Inventors: Young-Kwon Yoon, Seoul (KR); Ki-Huk Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 14/177,682

(22) Filed: Feb. 11, 2014

(65) Prior Publication Data

US 2014/0240220 A1    Aug. 28, 2014

(30) Foreign Application Priority Data

Feb. 22, 2013 (KR) .................. 10-2013-0018929

(51) Int. Cl.
*G06F 3/01* (2006.01)
*G06K 9/00* (2006.01)
*G06K 9/22* (2006.01)

(52) U.S. Cl.
CPC ............ *G06F 3/013* (2013.01); *G06K 9/00281* (2013.01); *G06K 9/00335* (2013.01); *G06K 9/228* (2013.01)

(58) Field of Classification Search
CPC combination set(s) only.
See application file for complete search history.

(56) References Cited

U.S. PATENT DOCUMENTS

2003/0017872 A1*  1/2003  Oishi ................ A63F 13/10
                                            463/33

FOREIGN PATENT DOCUMENTS

| JP | H1185452 A | 3/1999 |
| KR | 20110040199 A | 4/2011 |
| KR | 20120139893 A | 12/2012 |

* cited by examiner

*Primary Examiner* — Van Chow
(74) *Attorney, Agent, or Firm* — Jefferson IP Law, LLP

(57) ABSTRACT

A method and apparatus for controlling an operation of an electronic device are provided. The method for controlling the operation of the electronic device includes, when an event for controlling an operation of the electronic device using a feature occurs, analyzing images being input from a camera in real-time, determining a reference position based on a position of the feature within at least one image among the images being input, determining a reference region for determining the movement or non-movement of the feature, based on the determined reference position, and changing the reference position according to a position of the feature moved within the reference region.

21 Claims, 16 Drawing Sheets

METHOD FOR CONTROLLING OPERATION AND ELECTRONIC DEVICE THEREOF

CROSS-REFERENCE TO RELATED APPLICATION(S)

This application claims the benefit under 35 U.S.C. §119(a) of a Korean patent application filed on Feb. 22, 2013 in the Korean Intellectual Property Office and assigned Serial No. 10-2013-0018929, the entire disclosure of which is hereby incorporated by reference.

TECHNICAL FIELD

The present disclosure relates to a method and apparatus for controlling an operation of an electronic device.

BACKGROUND

With the growth of information telecommunication technologies and semiconductor technologies, portable electronic devices are developing into multimedia devices providing not only voice call services but also various multimedia services using data communication. For example, the portable electronic devices can provide various multimedia services such as broadcasting services, wireless Internet services, camera services, music playing services, and the like.

According to the related art, the portable electronic devices use a touch screen which is a single input/output device simultaneously performing input and display of information in order to improve a spatial utilization while improving a user convenience. As such, the portable electronic device with the touch screen detects a user's hand or a touch pen through the touch screen and performs an operation corresponding to a detected position of the touch screen. However, when the portable electronic device operates by detecting the user's hand or touch pen, there is a problem associated with a disabled user not being able to handle the portable electronic device. As a result, a way for recognizing a user's eye being input from a camera in the portable electronic device and controlling an operation of the portable electronic device has been under development in recent years. For example, a technique of detecting that the user's eye moves up and performing scrolling-up to update an image displayed on the touch screen, and detecting that the user's eye returns to the original position and stopping the scrolling-up in the portable electronic device is being provided.

However, the way of recognizing the movement of the user's eye and controlling the operation in the portable electronic device has a problem associated with performing an operation unwanted by a user. For example, generally, a user who catches the portable electronic device with a hand may conduct unintentional little hand-tremor, tilting, and up/down/left/right movement. In this case, the portable electronic device determines that the user's eye has been moved, and performs a specific operation previously mapped to the movement of the user's eye, such as scrolling.

In addition, according to the related art, if the user moves the user's eye up to perform a scrolling operation of the portable electronic device and then intends to turn the eye back to the original position to stop the scrolling operation of the portable electronic device, because the user has difficulty accurately recognizing the original position, the user's eye may be moved to any position (e.g., an arbitrary position) and thus, not the original position. At this time, the portable electronic device according to the related art performs an operation unintended by the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for updating the original position being an operation control reference in an electronic device to prevent an erroneous operation of the electronic device.

Another aspect of the present disclosure is to provide a method and apparatus for recognizing a feature in a face being input from a camera to determine the original reference position, and updating the reference position by periods according to a position change of the feature in an electronic device.

A further aspect of the present disclosure is to provide a method and apparatus for determining a reference position and a reference region based on a position of a feature within an image being input from a camera, and tracking a position change of the feature to update the reference position and the reference region based on a count in which the feature returns to the reference region in an electronic device.

Yet another aspect of the present disclosure is to provide a method and apparatus for determining a reference position and a reference region based on a position of a feature within an image being input from a camera, and tracking a position change of the feature to update the reference position and the reference region based on a movement direction of the feature in an electronic device.

The above aspects are achieved by providing a method for controlling operation and an electronic device thereof.

According to one aspect of the present disclosure, a method for controlling an operation of an electronic device is provided. The method includes, when an event for controlling an operation of the electronic device using a feature occurs, analyzing images being input from a camera in real-time, determining a reference position based on a position of the feature within at least one image among the images being input, determining a reference region for determining the movement or non-movement of the feature, based on the determined reference position, and changing the reference position according to a position of the feature moved within the reference region.

According to another aspect of the present disclosure, an electronic device is provided. The electronic device includes at least one processor configured to execute computer programs, a camera configured to capture images, a memory configured to store data and instructions, and one or more programs stored in the memory and configured to be executable by the at least one processor. The program includes an instruction of, when an event for controlling an operation of the electronic device using a feature occurs, analyzing images being input from a camera in real-time, an instruction of determining a reference position based on a position of the feature within at least one image among the images being input, an instruction of determining a reference region for determining the movement or non-movement of the feature, based on the determined reference position, and an instruction of changing the reference position according to a position of the feature moved within the reference region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a non-exhaustive illustration only, an electronic device described herein may refer to various electronic devices with cameras such as mobile communication terminals, smart phones, a Personal Digital Assistant (PDA), a portable game console, an MP3 player, a Portable/Personal Multimedia Player (PMP), a handheld e-book, tablet Personal Computers (PCs), digital cameras, navigators, laptop computers, netbooks, and the like.

Figure 1A:
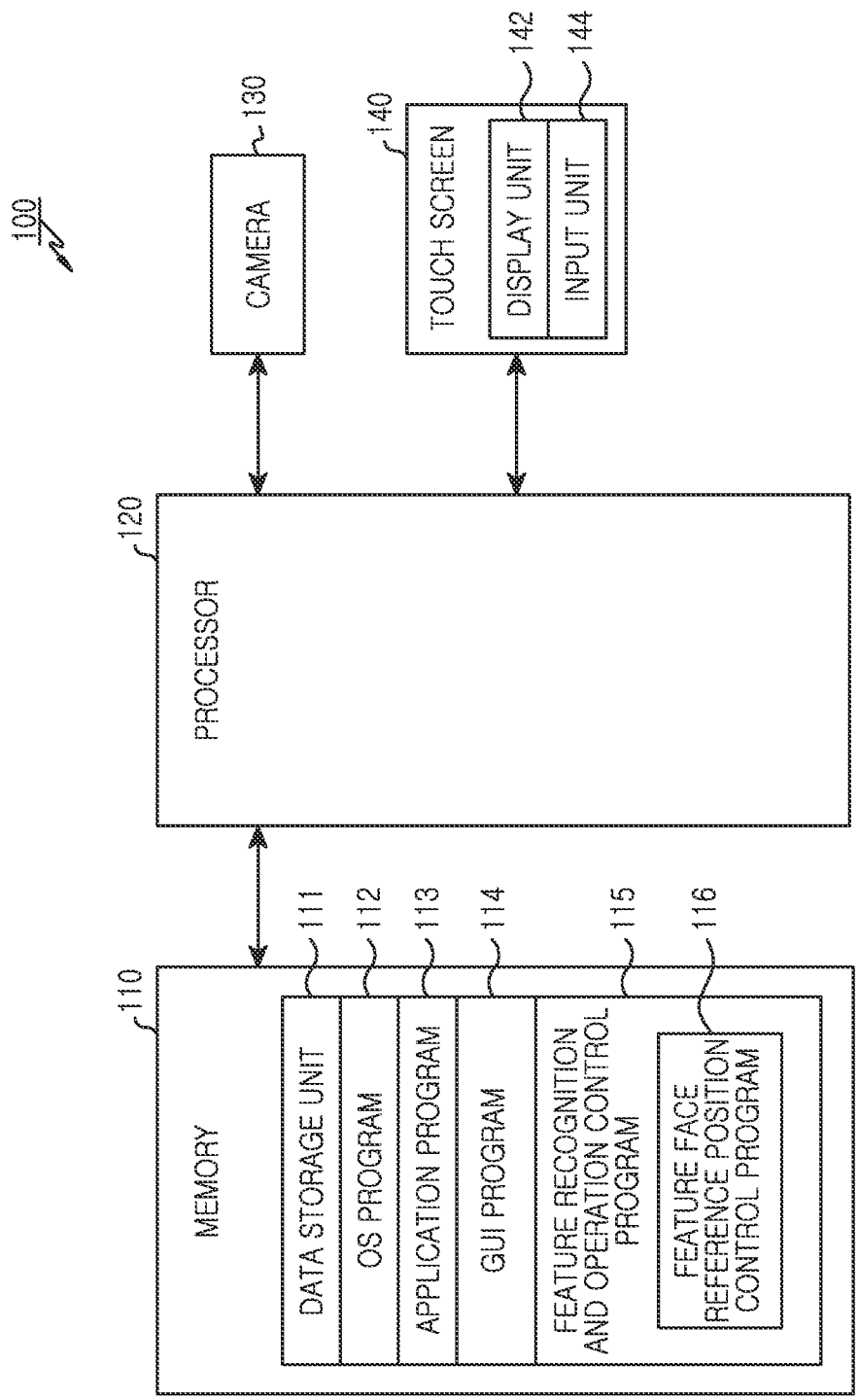
FIG. 1A is a block diagram illustrating a construction of an electronic device according to an embodiment of the present disclosure.
Figure 1B:
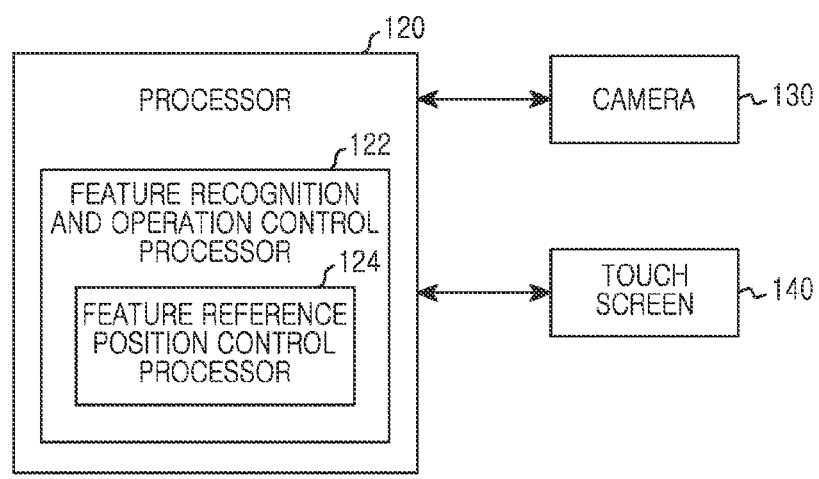
FIG. 1B is a block diagram illustrating a construction of a processor of an electronic device according to an embodiment of the present disclosure.
Figure 2A:
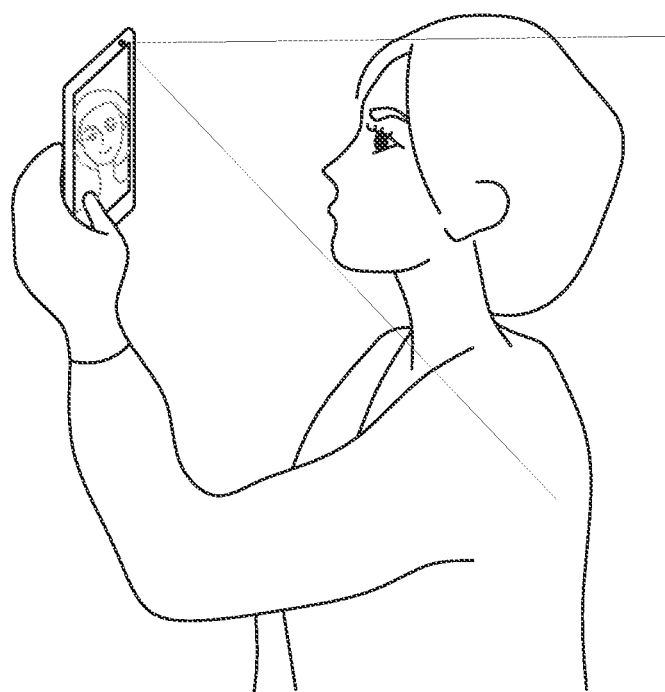
FIGS. 2A and 2B are diagrams illustrating an example of recognizing a feature of a user and determining a reference position in an electronic device according to an embodiment of the present disclosure.
Figure 2B:
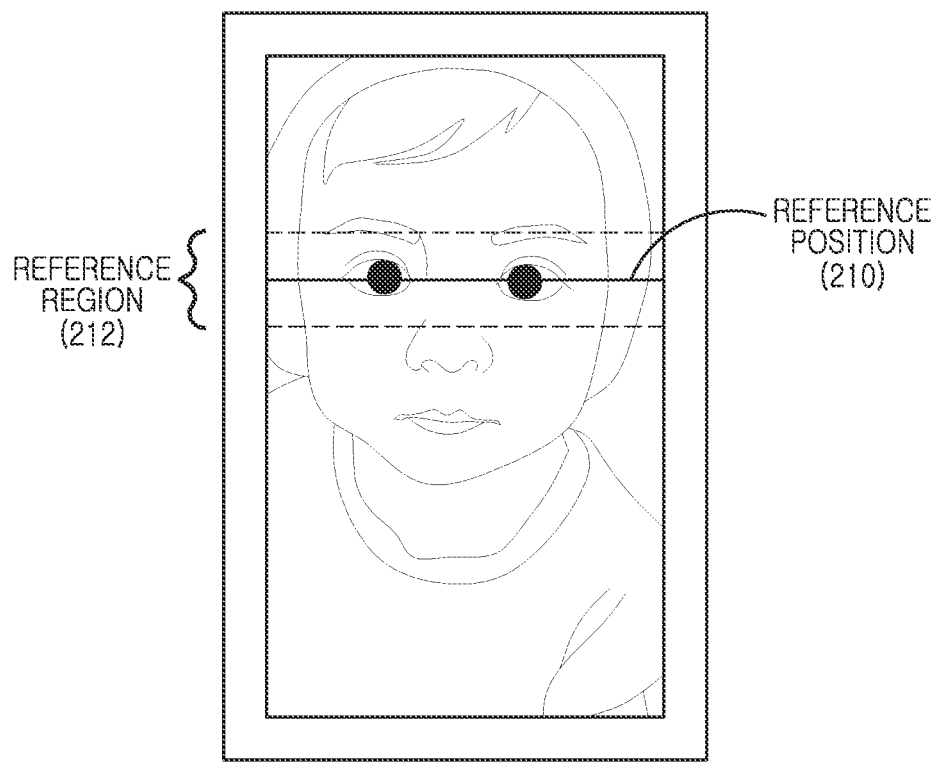
Figure 3A:
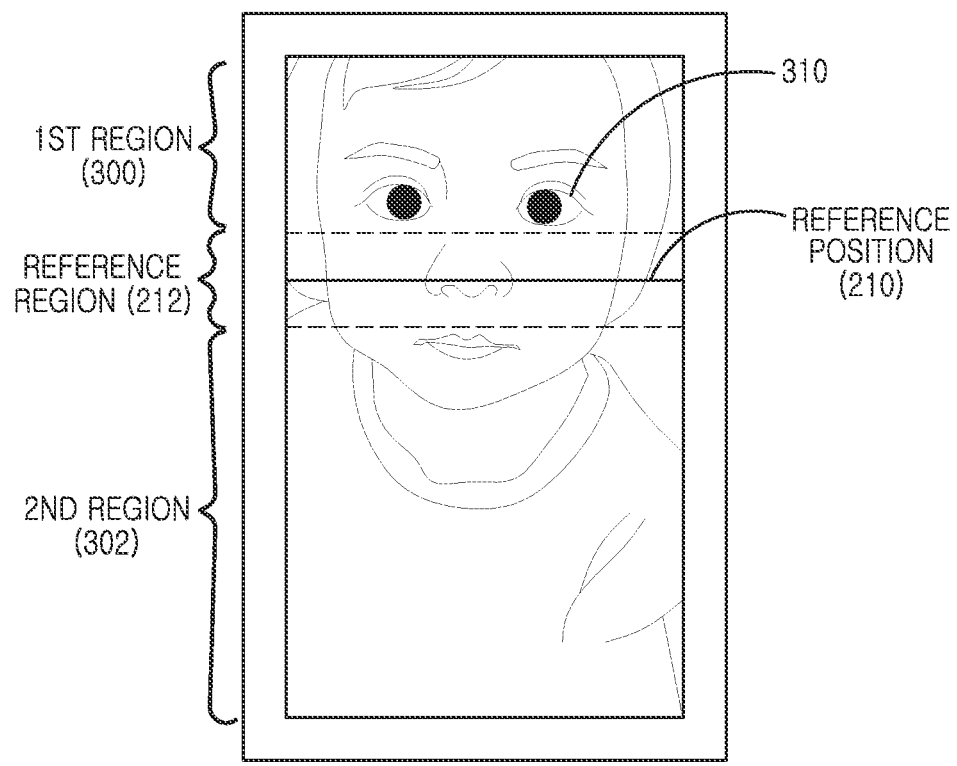
FIGS. 3A, 3B, and 3C are diagrams illustrating an example of changing a reference position according to a position change of a feature of a user in an electronic device according to an embodiment of the present disclosure.
Figure 3B:
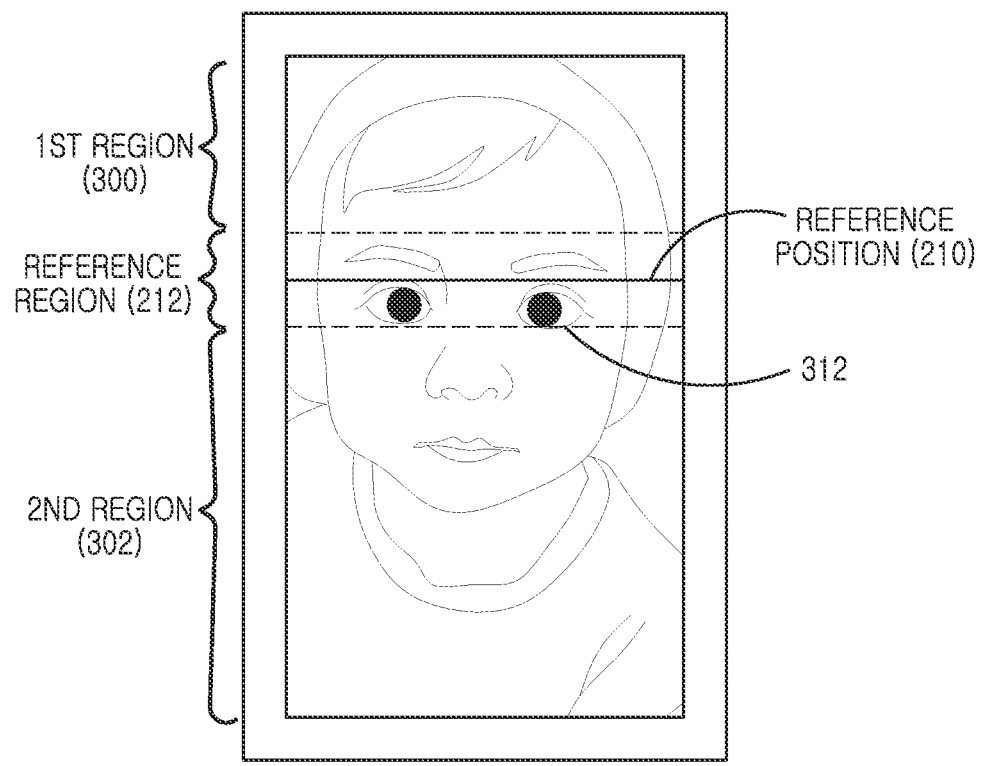
Figure 3C:
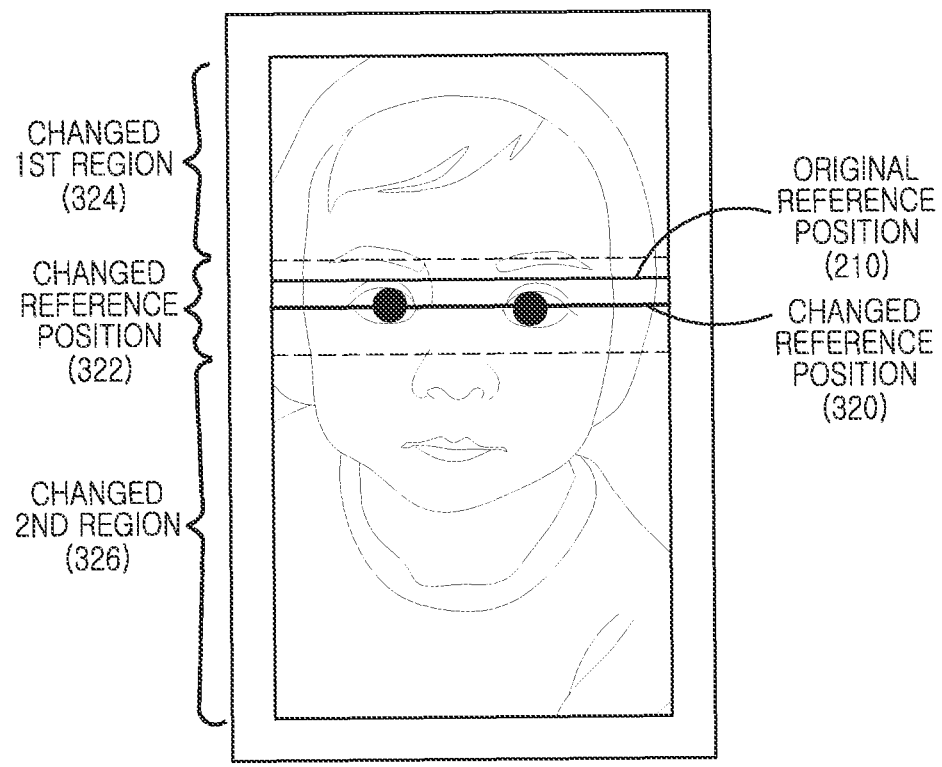

FIG. 1A is a block diagram illustrating a construction of an electronic device according to an embodiment of the present disclosure. FIG. 1B is a block diagram illustrating a construction of a processor of an electronic device according to an embodiment of the present disclosure. FIGS. 2A and 2B are diagrams illustrating an example of recognizing a feature of a user and determining a reference position in an electronic device according to an embodiment of the present disclosure. FIGS. 3A, 3B, and 3C are diagrams illustrating an example of changing a reference position according to a position change of a feature of a user in an electronic device according to an embodiment of the present disclosure.

Referring to FIG. 1A, the electronic device 100 may include a memory 110, a processor 120, a camera 130, and a touch screen 140. According to various embodiments of the present disclosure, the memory 110 and the processor 120 may be comprised of a plurality of memories 110 and a plurality of processors 120, respectively.

According to various embodiments of the present disclosure, the touchscreen 140 may include a display unit 142 (e.g., for displaying information received from the processor 120) and an input unit 144 (e.g., with which a user may input information to the electronic device 100).

The memory 110 may include a data storage unit 111, an Operating System (OS) program 112, an application program 113, a Graphical User Interface (GUI) program 114, a feature recognition and operation control program 115 and the like.

According to various embodiments of the present disclosure, a program being a software constituent element may be composed of a set of instructions (e.g., an instruction set). The program may be expressed as a module as well.

The memory 110 may store one or more programs including instructions of performing various embodiments of the present disclosure.

The data storage unit 111 stores data generated during the execution of a function corresponding to the program stored in the memory 110. According to an embodiment of the present disclosure, the data storage unit 111 may store information about the original reference position of a feature and a reference region set by the original reference position, according to control of the feature recognition and operation control program 115. The reference position may be a dot, a line, a diagram, and/or the like, and the data storage unit 111 may store at least one coordinate indicating the reference position. The reference region may be a region including the reference position, and the data storage unit 111 may store at least one coordinate indicating the reference region. The data storage unit 111 may store information about a changed reference position and a reference region set by the changed reference position, according to control of the feature recognition and operation control program 115.

The OS program 112 (e.g., an embedded operating system such as WINDOWS, LINUX, Darwin, RTXC, UNIX, OS X, VxWorks, or the like) includes various software constituent elements controlling general system operation. For example, the controlling of the general system operation represents memory control and management, storage hardware (device) control and management, power control and management, and the like. The OS program 112 performs a function of making smooth communication between various hardware (devices) and software constituent elements (programs).

The application program 113 includes applications for a browser function, an electronic mail (e-mail) function, a message function, a word processing function, an address book function, a widget function, a Digital Right Management (DRM) function, a voice recognition function, a voice replication function, a position determining function, a position-based service function, a call function, a schedule management function, a business management function, and the like.

The GUI program 114 includes at least one software constituent element for providing a user interface using a graphic between a user and the electronic device 100. For example, the GUI program 114 may include at least one software constituent element for displaying a request message for setting a reference position for a feature. The GUI program 114 may include an instruction of, when there is a change of the reference position of the feature, displaying an icon or message of showing that there is the change of the reference position of the feature (e.g., displaying an indication of a change in the reference position of the feature). The GUI program 114 may include an instruction of displaying the reference position of the feature by an icon or image such that a user may recognize a current reference position of the feature. According to various embodiments of the present disclosure, the icon or image indicating the reference position may be controlled in transparency in order not to disturb user's watching of the contents that are being displayed on the touch screen 140.

The feature recognition and operation control program 115 includes an instruction of recognizing a feature within a user face in an image being input from the camera 130 and controlling an operation of the electronic device. The feature within the user face may be a constituent element identifiable within the user face, such as a face form, the eyes, the eyeballs, the pupils, the nose, the mouth, the eyebrows, and the like. For example, the feature recognition and operation control program 115 may include an instruction of, when an event for controlling the electronic device using a feature occurs, requesting driving of the camera 130. The feature recognition and operation control program 115 may include an instruction of recognizing at least one image being input from the camera 130, extracting a feature within a user face, and determining a position of the extracted feature as a reference position of the feature. The feature recognition and operation control program 115 may determine a reference region on the basis of the determined reference position. The reference region represents a reference region for determining the movement or non-movement of the feature. For example, as the result of analyzing the image being input in real-time, if the feature is, though moving from the reference position to another position, included within the reference region, the feature recognition and operation control program 115 may determine that the feature has not been moved. If the feature is moved to a position outside the reference region, the feature recognition and operation control program 115 may determine that the feature has been moved. For example, as illustrated in FIG. 2A, the feature recognition and operation control program 115 may receive a user image taken through the camera 130 and, as illustrated in FIG. 2B, may extract the eye of a user face from the image to determine as a reference position 210 a position in which the eye is extracted and determine as a reference region 212 a region within a threshold distance from the reference position 210. Although FIGS. 2A and 2B illustrate that the user face is displayed on the touch screen 140 of the electronic device, such an illustration is for description convenience, and according to various embodiments of the present disclosure, when performing a process of setting the reference position 210 and the reference region 212, the electronic device may display an execution screen of an application being used by a user, instead of displaying the user face, on the touch screen 140.

According to various embodiments of the present disclosure, the feature recognition and operation control program 115 includes an instruction of recognizing an image being input in real-time from the camera 130, extracting a feature within a user face from the image, and comparing a position of the extracted feature with a reference position and a reference region to determine the movement or non-movement of the feature. For example, if a position of a feature within an image being newly input is neither the same as the reference position nor is included in the reference region, the feature recognition and operation control program 115 may determine that the feature has been moved. In contrast, if the position of the feature within the image being newly input is the same as the reference position, the feature recognition and operation control program 115 may determine that the feature has not been moved. If the position of the feature within the image being newly input is different from the reference position but is included in the reference region, the feature recognition and operation control program 115 may determine that the feature has not been moved. If it is determined that the feature has not been moved, the feature recognition and operation control program 115 may continuously analyze an image being input from the camera 130 in real-time to determine the movement or non-movement of the feature. In contrast, if the feature is determined to have been moved, the feature recognition and operation control program 115 may perform an operation corresponding to a region to which the feature has been moved, an operation corresponding to a movement direction of the feature, or an operation corresponding to a moved distance of the feature. For example, in a state in which the reference position 210 and the reference region 212 are set as illustrated in FIG. 2B, if a user's eye 310 is located in a 1st region 300, not the reference region 212 as illustrated in FIG. 3A, the feature recognition and operation control program 115 may determine that the user's eye 310 has been moved, and perform scrolling-up that is a function corresponding to the 1st region 300.

According to various embodiments of the present disclosure, the feature recognition and operation control program 115 includes a feature reference position control program 116. The feature reference position control program 116 includes an instruction of updating a reference position. The feature reference position control program 116 may update the reference position by periods, or may update the reference position on the basis of a count in which a feature returns to a reference region, or may update the reference position on the basis of a movement direction of the feature. The feature reference position control program 116 includes an instruction of, whenever updating the reference position, updating the reference region on the basis of the updated reference position. For example, in a state in which the reference position 210 and the reference region 212 are set according to a position of a user's eye as illustrated in FIG. 2B, if a user's eye 310 is determined to have moved to the 1st region 300, not the reference region 212 as illustrated in FIG. 3A and that a user's eye 312 then returns to the reference region 212 and stays in the reference region 212 for a predetermined time as illustrated in FIG. 3B. As illustrated in FIG. 3C, the feature reference position control program 116 may change the original reference position 210 and the original reference region 212 into a changed reference position 320 and a changed reference region 322 on a basis of a position of the user's eye 312. In addition, the original first region 300 may be changed to the changed first region 324, and the second region 302 may be changed to the changed second region 326. In other words, although a user moves the eye from the original reference position so as to control an application being executed in the electronic device and then attempts to turn the eye back to the original reference position so as to stop controlling the application, the eye may be turned back to an unintentional position of a little difference with the original reference position. According to various embodiments of the present disclosure, a reference position for controlling the application of the electronic device is changed into the unintentional position to which the user turns the eye back, instead of fixing the reference position to the original reference position of the eye.

A method for updating a reference position and a reference region in the feature reference position control program 116 according to various embodiments of the present disclosure is described below in detail. Three methods according to various embodiments of the present disclosure are each described below. However, according to various embodiments of the present disclosure, at least two or more of the three methods described below may be mixed (e.g., combined) and used according to a design scheme.

According to various embodiments of the present disclosure, the feature reference position control program 116 may update a reference position after the lapse of a predetermined time from a time point of determining the reference position. According to various embodiments of the present disclosure, whenever a feature stays in a specific position within a reference region for a predetermined time or longer during a predetermined time duration, the feature reference position control program 116 may measure corresponding specific positions and thus, update the reference position into an average value of the measured specific positions. According to various embodiments of the present disclosure, when the feature stays in a specific position within the reference region for a predetermined time or longer after the predetermined time duration, the feature reference position control program 116 may update the reference position into the specific position.

Figure 4A:
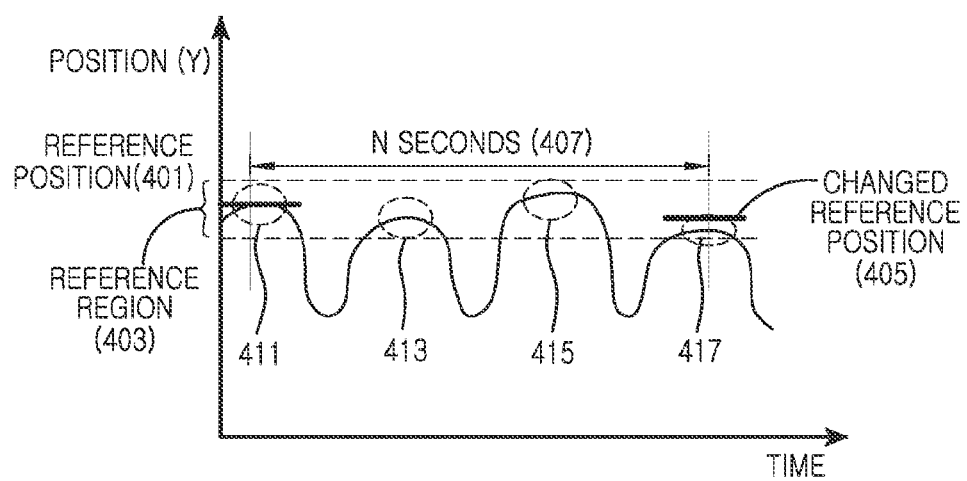
FIG. 4A is a diagram illustrating an example of changing a reference position by periods in an electronic device according to an embodiment of the present disclosure.

FIG. 4A illustrates an example of changing a reference position by periods in an electronic device according to an embodiment of the present disclosure. The horizontal axis denotes time, and the vertical axis denotes a Y-axis coordinate of an image.

Referring to FIG. 4A, the feature reference position control program 116 determines as a reference position 401 the original position 411 of a feature, and determines as a reference region 403 a region including a position of difference of as much as a threshold value with the reference position 401. After determining the reference position 401 and the reference region 403, the feature reference position control program 116 counts preset 'N' seconds 407 while tracking a moved position of the feature during the 'N' seconds 407. After the completion of counting the 'N' seconds 407, the feature reference position control program 116 may change the reference position 401 into a changed reference position 405 that is an average value of positions 413, 415, and 417 in which the feature stays within the reference region 403 for a threshold time or longer during the 'N' seconds 407. Alternately, according to various embodiments of the present disclosure, after the completion of counting the 'N' seconds 407, the feature reference position control program 116 may change the reference position 401 into the position 417 in which the feature stays within the reference region 403 for a threshold time or longer after the 'N' seconds 407, not during the 'N' seconds 407. According to various embodiments of the present disclosure, although not illustrated the reference region 403 may be correspondingly changed according to the changed reference position 405.

According to various embodiments of the present disclosure, the feature reference position control program 116 may update a reference position on the basis of a count in which a feature returns to a reference region. For example, after determining the reference position, the feature reference position control program 116 may determine a count in which a feature moves to a region outside the reference region, returns to the reference region, and stays in an arbitrary position for a threshold time or longer. If the determined count is consistent with a preset threshold count, the feature reference position control program 116 may update the reference position. At this time, the reference position may be updated into an average value of positions of the feature corresponding to the preset threshold count.

Figure 4B:
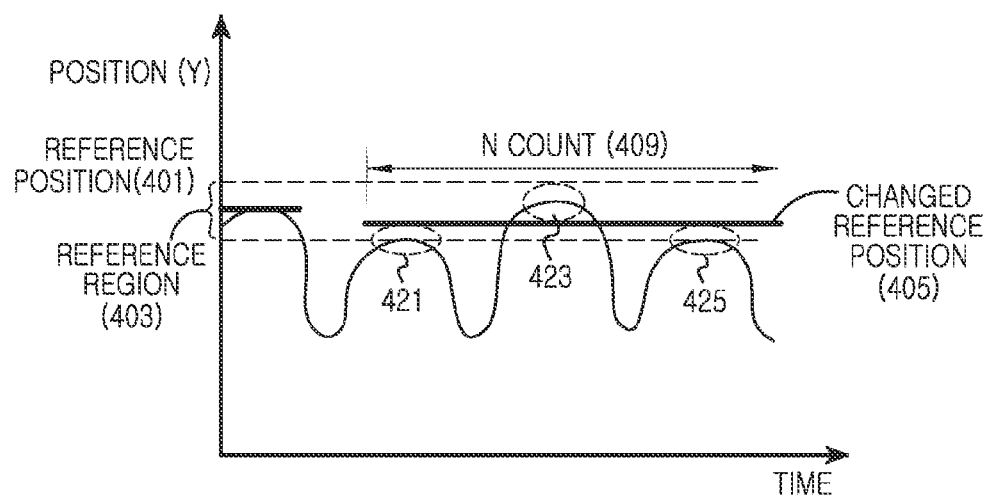
FIG. 4B is a diagram illustrating an example of changing a reference position on a basis of a count in which a feature returns to a reference region in an electronic device according to an embodiment of the present disclosure.

FIG. 4B illustrates an example of changing a reference position on a basis of a count in which a feature returns to a reference region in an electronic device according to an embodiment of the present disclosure. The horizontal axis denotes time, and the vertical axis denotes a Y-axis coordinate of an image.

Referring to FIG. 4B, the feature reference position control program 116 determines as a reference position 401 the original position 411 of a feature, and determines as a reference region 403 a region including a position of difference of as much as a threshold value with the reference position 401. After determining the reference position 401 and the reference region 403, the feature reference position control program 116 tracks a moved position of the feature and, while determining a count, simultaneously records positions 421, 423, and 425 in which the feature moves to a region outside the reference region 403, returns to the reference region 403, and stays within the reference region 403 for a predetermined time or longer. Assuming that the threshold count 'N' is equal to '3', when recording the three positions 421, 423, and 425 in which the feature moves to the region outside the reference region 403, returns to the reference region 403, and stays within the reference region 403 for the predetermined time or longer, the feature reference position control program 116 changes the reference position 401 into a changed reference position 405 that is an average value of the three positions 421, 423, and 425. According to various embodiments of the present disclosure, although not illustrated the reference region 403 is changed according to the changed reference position 405.

According to various embodiments of the present disclosure, the feature reference position control program 116 may update a reference position on the basis of a movement direction of a feature. For example, the feature reference position control program 116 may detect that the feature moves alternatively to at least two regions, which are located in different directions with respect to a reference region, among regions outside the reference region, and update the reference position. In detail, after determining the reference position, if the feature moves to a 1st region outside the reference region, returns to the reference region, and stays in an arbitrary position for a predetermined time or longer and then again moves to a 2nd region outside the reference region, returns to the reference region, and stays in an arbitrary position for a threshold time or longer, the feature reference position control program 116 may update the reference position on the basis of the arbitrary positions.

Figure 4C:
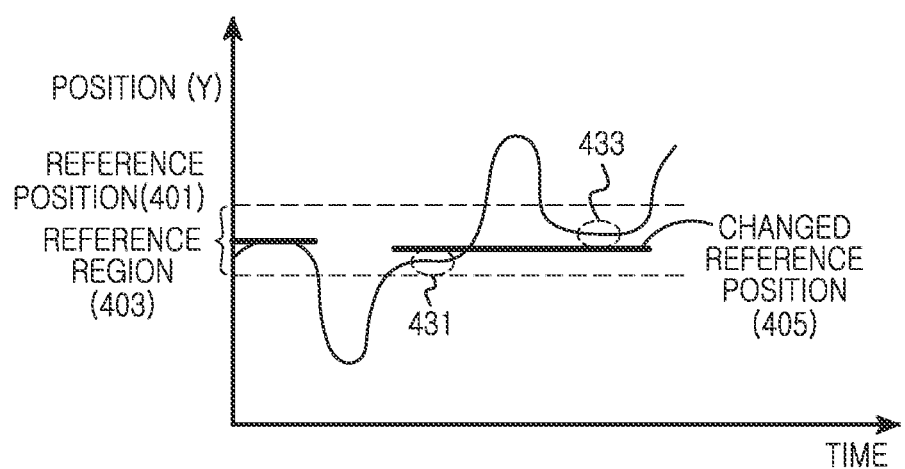
FIG. 4C is a diagram illustrating an example of changing a reference position on a basis of a movement direction of a feature in an electronic device according to an embodiment of the present disclosure.

FIG. 4C illustrates an example of changing a reference position on a basis of a movement direction of a feature in an electronic device according to an embodiment of the present disclosure. The horizontal axis denotes time, and the vertical axis denotes a Y-axis coordinate of an image.

Referring to FIG. 4C, the feature reference position control program 116 determines as a reference position 401 the original position 411 of a feature, and determines as a reference region 403 a region including a position of difference of as much as a threshold value with the reference position 401. After determining the reference position 401 and the reference region 403, the feature reference position control program 116 may track a moved position of the feature and detect that the feature moves to a 1st region outside the reference region 403, returns to the reference region 403, and stays in an arbitrary position 431 for a predetermined time or longer and then moves to a 2nd region outside the reference region 403, returns to the reference region 403, and stays in an arbitrary position 433 for a predetermined time or longer. At this time, the feature reference position control program 116 may change the reference position 401 into a reference position 405 that is an average value of the two positions 431 and 433 in which the feature stays for the predetermined time or longer. According to various embodiments of the present disclosure, although not illustrated, the reference region 403 may be changed according to the changed reference position 405. Detecting that the feature moves alternatively to the regions located in the different directions and changing the reference position is for preventing the reference position from being biased in one direction owing to the repeated change of the reference position.

Although not illustrated, the processor 120 may include at least one processor and peripheral interface. The processor 120 may execute a specific program (e.g., an instruction set) stored in the memory 110 and perform a plurality of specific functions corresponding to the specific program.

The camera 130 is driven by control of the processor 120 to take an image. The cameras 130 may be at least two or more provided in different positions of the electronic device 100. Particularly, according to an embodiment of the present disclosure, when an event for controlling the electronic device 100 using a feature occurs, the camera 130 may be driven to take an image of a user face in real-time.

The touch screen 140, which is a touch-sensitive display, provides an interface for input/output between the electronic device 100 and a user. For example, the touch screen 140 is a medium for detecting a touch (e.g., a contact, a hover event, and/or the like) through a touch sensor (not shown), forwarding the detected touch input to the electronic device 100, and providing a visual output of the electronic device 100 to the user. For example, in response to the touch input, the touch screen 140 provides the user with a visual output based on a text, a graphic, and a video.

The touch screen 140 includes a touch-sensitive surface detecting a user's touch input, and detects an input of a user touch by means of a haptic contact, a tactile contact, or a combination scheme thereof. For example, a touch-sensitive point of the touch screen 140 corresponds to a digit of a finger that is used for a contact on the touch-sensitive surface. The touch screen 140 detects a contact of an external device such as a stylus pen and the like through the touch-sensitive surface. The detected contact is converted into interaction corresponding to a user interface target (e.g., a soft key) displayed on the touch screen 140.

The touch screen 140 may use various display technologies such as a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), or the like. According to various embodiments of the present disclosure, the touch screen 140 of is not limited to a touch screen employing the above-identified display technologies. The touch screen 140 may detect a start of a contact on a touch-sensitive surface, a movement of the contact, or an interruption or end of the contact, by using various touch detection (e.g., sensing) technologies such as capacitive detection, resistive detection, infrared detection, surface acoustic wave detection technologies, or the like. According to various embodiments of the present disclosure, the touch screen 140 may display an icon, an image, a message, and/or the like for showing that a function of controlling the electronic device 100 using a feature is being conducted. The touch screen 140 may display a request message for setting a reference position of the feature and, when there is a change of the reference position of the feature, the touch screen 140 may display that there is the change of the reference position of the feature. The touch screen 140 may display the reference position of the feature such that a user can recognize a current reference position of the feature. Further, when the electronic device 100 performs a function of controlling the electronic device 100 using the feature, the touch screen 140 may display an execution screen of an application selected by the user, instead of an image being input from the camera 130.

FIG. 1B illustrates a construction of a processor of an electronic device according to an embodiment of the present disclosure.

Referring to FIG. 1B, the processor 120 includes a feature recognition and operation control processor 122.

The feature recognition and operation control processor 122 recognizes a feature within a user face in an image being input from the camera 130 and controls an operation of the electronic device. The feature within the user face may be a constituent element identifiable within the user face, such as a face form, the eyes, the eyeballs, the pupils, the nose, the mouth, the eyebrows, and the like. For example, when an event for controlling the electronic device using a feature occurs, the feature recognition and operation control processor 122 may request driving of the camera 130. The feature recognition and operation control processor 122 may recognize at least one image being input from the camera 130, extract a feature within a user face, and determine a position of the extracted feature as a reference position of the feature. The feature recognition and operation control processor 122 may determine a reference region on the basis of the determined reference position. The reference region represents a reference region for determining the movement or non-movement of the feature. For example, as the result of analyzing the image being input in real-time, if the feature is, though moving from the reference position to another position, included within the reference region, the feature recognition and operation control processor 122 may determine that the feature has not been moved. If the feature is moved to a position outside the reference region, the feature recognition and operation control processor 122 may determine that the feature has been moved.

The feature recognition and operation control processor 122 may recognize an image being input in real-time from the camera 130, extract a feature within a user face from the image, and compare a position of the extracted feature with a reference position and a reference region to determine the movement or non-movement of the feature. For example, if a position of a feature within an image being newly input is neither the same as the reference position nor is included in the reference region, the feature recognition and operation control processor 122 may determine that the feature has been moved. In contrast, if the position of the feature within the image being newly input is the same as the reference position or the position of the feature within the image being newly input is different from the reference position but is included in the reference region, the feature recognition and operation control processor 122 may determine that the feature has not been moved. If it is determined that the feature has not been moved, the feature recognition and operation control processor 122 may continuously analyze an image being input from the camera 130 in real-time to determine the movement or non-movement of the feature. In contrast, if it is determined that the feature has been moved, the feature recognition and operation control processor 122 may perform an operation corresponding to a region to which the feature has been moved, an operation corresponding to a movement direction of the feature, or an operation corresponding to a moved distance of the feature.

According to various embodiments of the present disclosure, the feature recognition and operation control processor 122 includes a feature reference position control processor 124. The feature reference position control processor 124 performs a function for updating a reference position. The feature reference position control processor 124 may update the reference position by periods, or may update the reference position on the basis of a count in which a feature returns to a reference region, or may update the reference position on the basis of a movement direction of the feature. The feature reference position control processor 124 may perform a function for, whenever updating the reference position, updating the reference region on the basis of the updated reference position. In general, although a user moves the eye from the original reference position so as to control an application being executed in the electronic device and then attempts to turn the eye back to the original reference position so as to stop controlling the application, the eye may be turned back to an unintentional position of a little difference with the original reference position. According to various embodiments of the present disclosure, a reference position for controlling the application of the electronic device may be changed, into the unintentional position to which the user turns the eye back, instead of fixing the reference position to the original reference position of the eye.

A method for updating a reference position and a reference region in the feature reference position control processor 124 according to various embodiments of the present disclosure is described below in detail. Three methods are each described below. However, according to various embodiments of the present disclosure, at least two or more of the three methods described below may be mixed (e.g., combined) and used according to a design scheme.

According to various embodiments of the present disclosure, the feature reference position control processor 124 may update a reference position after the lapse of a predetermined time from a time point of determining the reference position. At this time, whenever a feature stays in a specific position within a reference region for a predetermined time or longer during a predetermined time duration, the feature reference position control processor 124 may measure corresponding specific positions and thus, update the reference position into an average value of the measured specific positions. According to various embodiments of the present disclosure, when the feature stays in a specific position within the reference region for a predetermined time or longer after the predetermined time duration, the feature reference position control processor 124 may update the reference position into the specific position.

According to various embodiments of the present disclosure, the feature reference position control processor 124 may update a reference position on the basis of a count in which a feature returns to a reference region. For example, after determining the reference position, the feature reference position control processor 124 may determine a count in which a feature moves to a region outside the reference region, returns to the reference region, and stays in an arbitrary position for a threshold time or longer. If the determined count is consistent with a preset threshold count, the feature reference position control processor 124 may update the reference position. The reference position may be updated into an average value of positions of the feature corresponding to the preset threshold count.

According to various embodiments of the present disclosure, the feature reference position control processor 124 may update a reference position on the basis of a movement direction of a feature. For example, the feature reference position control processor 124 may detect that the feature moves alternatively to at least two regions, which are located in different directions with respect to a reference region, among regions outside the reference region, and update the reference position. According to various embodiments of the present disclosure, after determining the reference position, if the feature moves to a 1st region outside the reference region, returns to the reference region, and stays in an arbitrary position for a predetermined time or longer and then again moves to a 2nd region outside the reference region, returns to the reference region, and stays in an arbitrary position for a threshold time or longer, the feature reference position control processor 124 may update the reference position on the basis of the arbitrary positions.

A procedure of performing an exemplary method of updating a reference position of a feature and a reference region thereof in an electronic device is described below in detail.

Figure 5:
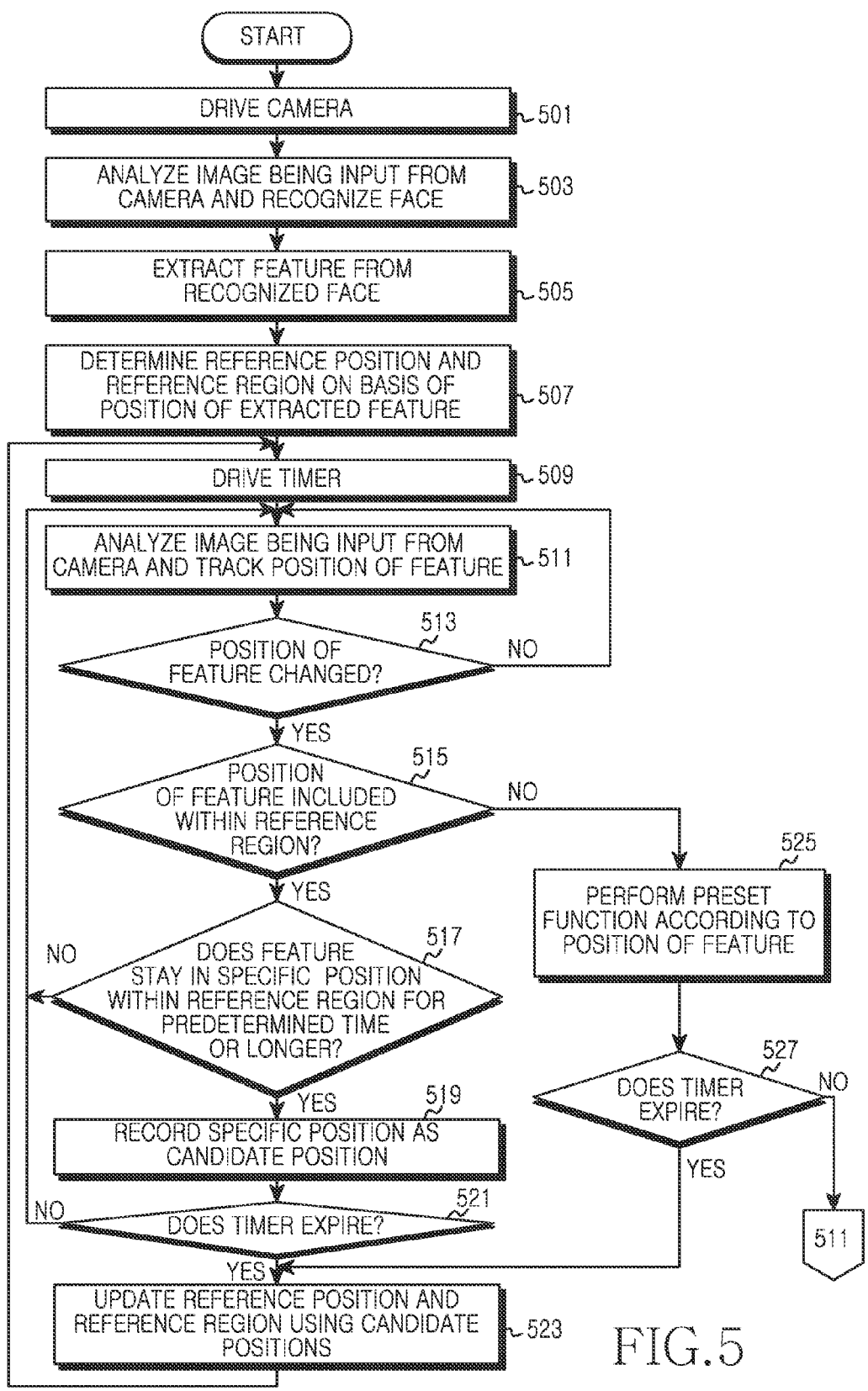
FIG. 5 is a flowchart illustrating a procedure of changing a reference position by periods in an electronic device according to an embodiment of the present disclosure.

FIG. 5 illustrates a procedure of changing a reference position by periods in an electronic device according to an embodiment of the present disclosure.

Referring to FIG. 5, at operation 501, the electronic device drives a camera. The camera may be driven automatically when an event for controlling the electronic device using a feature occurs.

At operation 503, the electronic device analyzes an image being input from the camera and recognizes a user face.

At operation 505, the electronic device extracts a feature from the recognized user face. The feature may be one of constituent elements identifiable within the user face, such as a face form, the eyes, the eyeballs, the pupils, the nose, the mouth, the eyebrows, and the like.

At operation 507, the electronic device determines a reference position and a reference region on the basis of a position of the extracted feature. For example, as illustrated in FIG. 2B, the electronic device may extract the eye from the user face to determine as a reference position 210 a position in which the eye is extracted and determine as a reference region 212 a region within a threshold distance from the reference position 210. Although FIGS. 2A and 2B illustrate that the user face is displayed on the touch screen 140 of the electronic device, such an illustration is for description convenience, and according to various embodiments of the present disclosure, when performing a process of setting the reference position 210 and the reference region 212, the electronic device may display an execution screen (e.g., a web browser execution screen, or the like) of an application being used by a user, instead of displaying the user face, on the touch screen 140.

At operation 509, the electronic device drives a timer. The timer signifies a timer for counting a preset time and updating the reference position.

At operation 511, the electronic device analyzes an image being input from the camera and tracks a position of the feature.

At operation 513, the electronic device determines whether a position of the feature has changed. For example, the electronic device analyzes an image being input in real-time from the camera to confirm a position of the feature, and determines whether the confirmed position of the feature is the same as the reference position.

If the confirmed position of the feature is not the same as the reference position, the electronic device may determine that there is the change of the position of the feature. If the electronic device determines that the position of the feature has not changed at operation 513, then the electronic device returns to operation 511 and again performs the subsequent operations. Although not illustrated, the operation of analyzing the image being input from the camera in real-time and tracking the position of the feature may be continuously performed in operations described later.

In contrast, if the electronic device determines that the position of the feature has changed at operation 513, then the electronic device proceeds to operation 515 at which the electronic device determines whether the position of the feature is included within the reference region. For example, the electronic device determines whether the feature is moved to not the reference position but another position within the reference region. If the feature is determined to have moved within the reference region, the electronic device may determine that the movement of the feature results from user's unintentional hand-tremor, tilting, or movement and thus, may determine that the feature is not moved.

If the electronic device determines that the position of the feature is included within the reference region at operation 515, then the electronic device determines that the feature is not moved and then, proceeds to operation 517 at which the electronic device determines whether the feature stays in a specific position within the reference region for a preset time or longer.

If the electronic device determines that the feature does not stay in the specific position for the preset time or longer at operation 517, then the electronic device returns to operation 511 and again performs the subsequent operations.

In contrast, if the electronic device determines that the feature stays in the specific position for the preset time or longer at operation 517, the electronic device proceeds to operation 519 at which the electronic device records as a candidate position the specific position in which the feature stays for the preset time or longer.

Thereafter, the electronic device proceeds to operation 521 at which the electronic device determines whether the timer expires. The candidate position signifies a position to be used for updating the reference position.

If the electronic device determines the timer does not expire (or has not expired) at operation 521, then the electronic device returns to operation 511 and again performs the subsequent operations.

In contrast, if the electronic device determines that the timer expires at operation 521, then the electronic device proceeds to operation 523 at which the electronic device updates the reference position using at least one candidate position that is recorded till a current time point. The electronic device may update the reference region on the basis of the updated reference position. When the recorded candidate position is plural, the electronic device may select one candidate position among the plurality of candidate positions and change the reference position into the selected candidate position, or change the reference position into an average value of at least two or more candidate positions among the plurality of candidate positions.

Thereafter, the electronic device returns to operation 509. Although not illustrated, after performing operation 523, the electronic device may delete information of candidate positions recorded until a current time point and then return to operation 509.

In contrast, if the electronic device determines that the position of the feature is not included within the reference region at operation 515, then the electronic device proceeds to 525 at which the electronic device performs a preset function according to the position of the feature. For example, if a user's eye 310 is located in a 1st region 300 that is a region outside a reference region 212 as illustrated in FIG. 3A, the electronic device may perform scrolling-up that is a function corresponding to the 1st region 300.

Thereafter, at operation 527, the electronic device detects whether the timer expires.

If the electronic device determines that the timer expires at operation 527, then the electronic device proceeds to operation 523 at which the electronic device updates the reference position using a recorded at least one candidate position. At this time, the electronic device may update the reference region on the basis of the updated reference position. Thereafter, the electronic device deletes information of candidate positions recorded until a current time point and then returns to operation 509.

In contrast, if the electronic device determines that the timer does not expire at operation 509, then the electronic device returns to operation 511. For example, as illustrated in FIG. 4A, after determining a reference position 401 and a reference region 403, the electronic device counts preset 'N' seconds 407 while tracking a moved position of the feature during the 'N' seconds 407. After the 'N' seconds 407 lapse, the electronic device may change the reference position 401 into a reference position 405 that is an average value of positions 413, 415, and 417 in which the feature stays within the reference region 403 for a threshold time or longer during the 'N' seconds 407. Alternately, according to an embodiment of the present disclosure, after the 'N' seconds 407 lapse, the electronic device may change the reference position 401 into the position 417 in which the feature stays within the reference region 403 for a threshold time or longer after the 'N' seconds 407, not during the 'N' seconds 407. According to various embodiments of the present disclosure, although not illustrated, the reference region 403 may be changed according to the changed reference position 405.

Figure 6A:
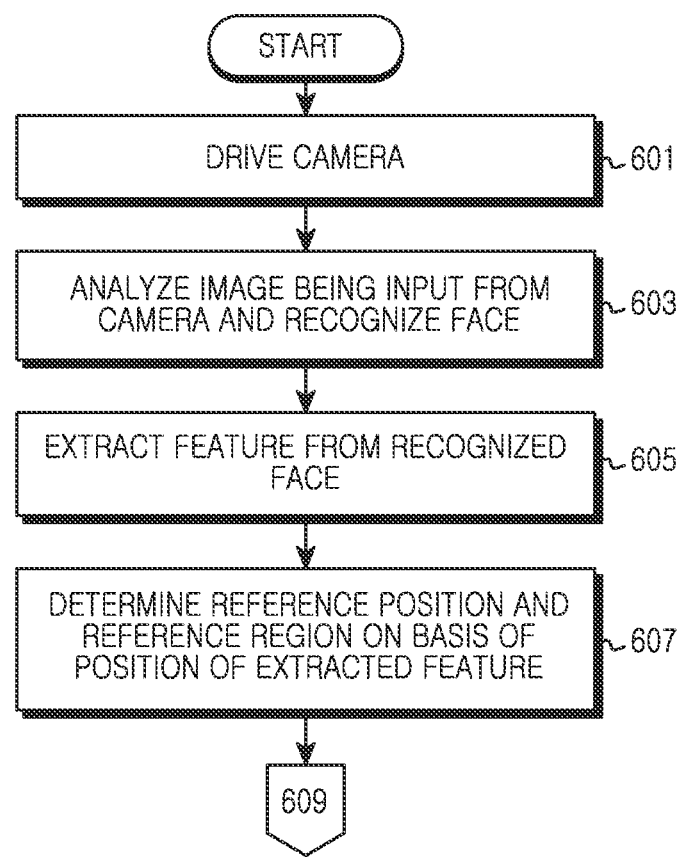
FIGS. 6A and 6B are flowcharts illustrating a procedure of changing a reference position on a basis of a count in which a feature returns to a reference region in an electronic device according to an embodiment of the present disclosure.
Figure 6B:
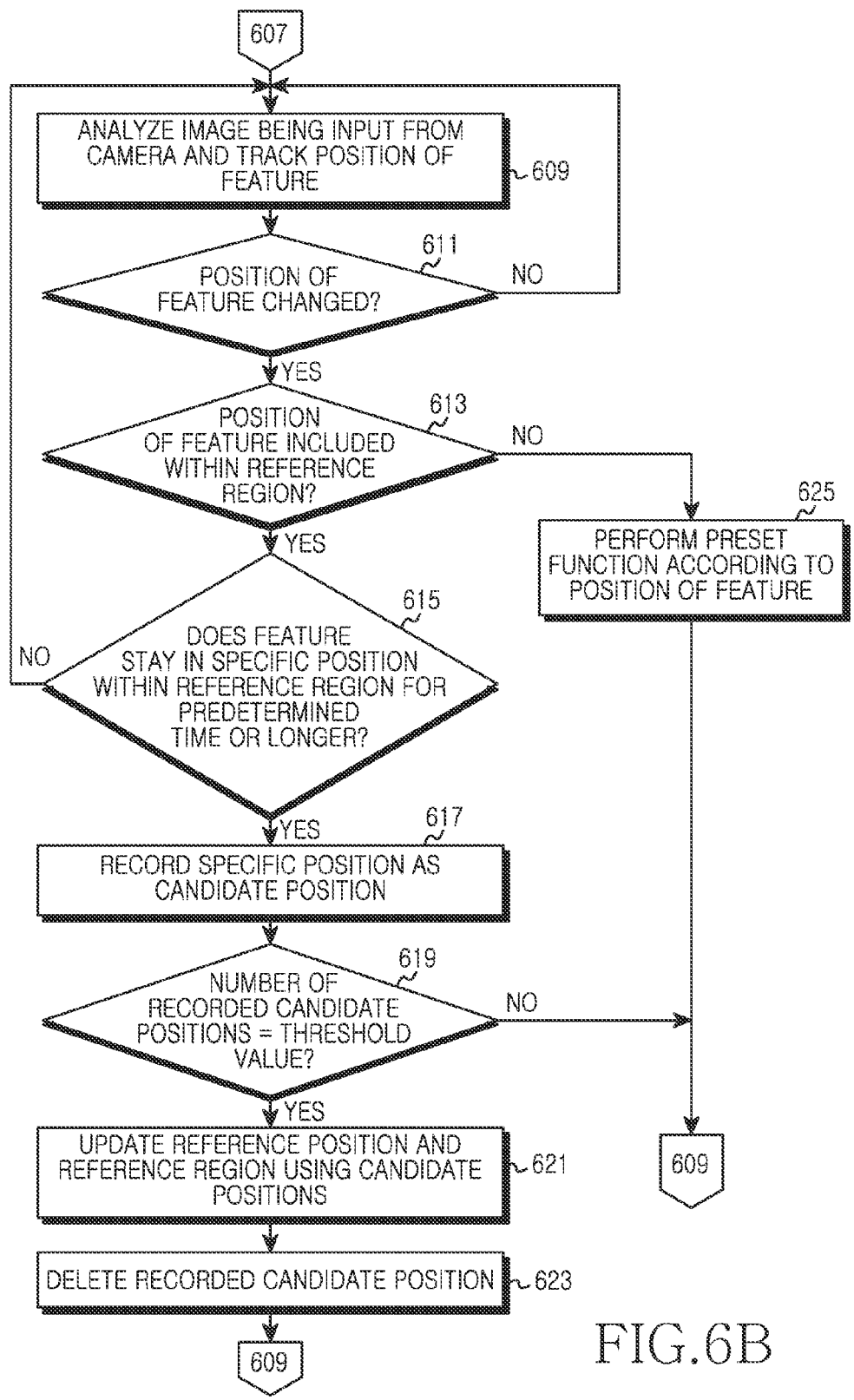

FIGS. 6A and 6B illustrate a procedure of changing a reference position on a basis of a count in which a feature returns to a reference region in an electronic device according to an embodiment of the present disclosure.

Referring to FIGS. 6A and 6B, at operation 601, the electronic device drives a camera. The camera may be driven automatically when an event for controlling the electronic device using a feature occurs.

At operation 603, the electronic device analyzes an image being input from the camera and recognizes a user face.

At operation 605, the electronic device extracts a feature from the recognized user face. The feature may be one of constituent elements identifiable within the user face, such as a face form, the eyes, the eyeballs, the pupils, the nose, the mouth, the eyebrows, and the like.

At operation 607, the electronic device determines a reference position and a reference region on the basis of a position of the extracted feature. For example, as illustrated in FIG. 2B, the electronic device may extract the eye from the user face to determine as a reference position 210 a position in which the eye is extracted and determine as a reference region 212 a region within a threshold distance from the reference position 210. Although FIGS. 2A and 2B illustrate that the user face is displayed on the touch screen 140 of the electronic device, such an illustration is for description convenience, and according to various embodiments of the present disclosure, when performing a process of setting the reference position 210 and the reference region 212, the electronic device may display an execution screen (e.g., a web browser execution screen, or the like) of an application being used by a user, instead of displaying the user face, on the touch screen 140.

At operation 609, the electronic device analyzes an image being input from the camera and tracks a position of the feature.

At operation 611, the electronic device determines whether a position of the feature has changed. For example, the electronic device analyzes an image being input in real-time from the camera to confirm a position of the feature, and determines whether the confirmed position of the feature is the same as the reference position.

If the confirmed position of the feature is not the same as the reference position, the electronic device may determine that there is the change of the position of the feature. If the electronic device determines that the position of the feature has not changed at operation 611, then the electronic device returns to operation 609 and again performs the subsequent operations. Although not illustrated in the drawings, the operation of analyzing the image being input from the camera in real-time and tracking the position of the feature may be continuously performed in operations described later.

In contrast, if the electronic device determines that the position of the feature has changed at operation 611, then the electronic device proceeds to operation 613 at which the electronic device determines whether the position of the feature is included within the reference region. For example, the electronic device determines whether the feature is moved to not the reference position but another position within the reference region. If the feature is determined to have moved within the reference region, the electronic device may determine that the movement of the feature results from user's unintentional hand-tremor, tilting, or movement and thus, may determine that the feature is not moved.

If the electronic device determines that the position of the feature is included within the reference region at operation 613, then the electronic device determines that the feature is not moved and then, proceeds to operation 615 at which the electronic device determines whether the feature stays in a specific position within the reference region for a preset time or longer.

If the electronic device determines that the feature does not stay in the specific position for the preset time or longer at operation 615, then the electronic device returns to operation 609 and again performs the subsequent operations.

In contrast, if the electronic device determines that the feature stays in the specific position for the preset time or longer at operation 615, then the electronic device proceeds to operation 617 at which the electronic device records as a candidate position the specific position in which the feature stays for the preset time or longer.

At operation 619 the electronic device determines whether the number of the recorded candidate positions is equal to a threshold value.

If the electronic device determines that the number of the recorded candidate positions is not equal to the threshold value at operation 619, then the electronic device returns to operation 609 and again performs the subsequent operations. The candidate position signifies a position to be used for updating the reference position.

In contrast, if the electronic device determines that the number of the recorded candidate positions is equal to the threshold value at operation 619, then the electronic device proceeds to operation 621 at which the electronic device updates the reference position using at least one candidate position recorded till a current time point. When the recorded candidate position is plural, the electronic device may select one candidate position among the plurality of candidate positions and change the reference position into the selected candidate position, or may change the reference position into an average value of two or more candidate positions among the plurality of candidate positions. The electronic device may update the reference region on the basis of the updated reference position.

At operation 623, the electronic device may delete information of candidate positions recorded until a current time point and then return to operation 609. For example, as illustrated in FIG. 4B, after determining a reference position 401 and a reference region 403, the electronic device tracks a moved position of the feature and, while determining a count, simultaneously records positions 421, 423, and 425 in which the feature moves to a region outside the reference region 403, returns to the reference region 403, and stays within the reference region 403 for a predetermined time or longer. Assuming that the threshold count is equal to '3', the electronic device may change the reference position 401 into a reference position 405 that is an average value of the recorded three positions 421, 423, and 425. According to various embodiments of the present disclosure, although not illustrated, the reference region 403 may be changed according to the changed reference position 405.

If the electronic device determines that the position of the feature is not included within the reference region at operation 613, then the electronic device proceeds to 625 and performs a preset function according to the position of the feature. For example, if a user's eye 310 is located in a 1st region 300 that is a region outside a reference region 212 as illustrated in FIG. 3A, the electronic device may perform scrolling-up that is a function corresponding to the 1st region 300. Thereafter, the electronic device returns to operation 609 and again performs the subsequent operations.

Figure 7A:
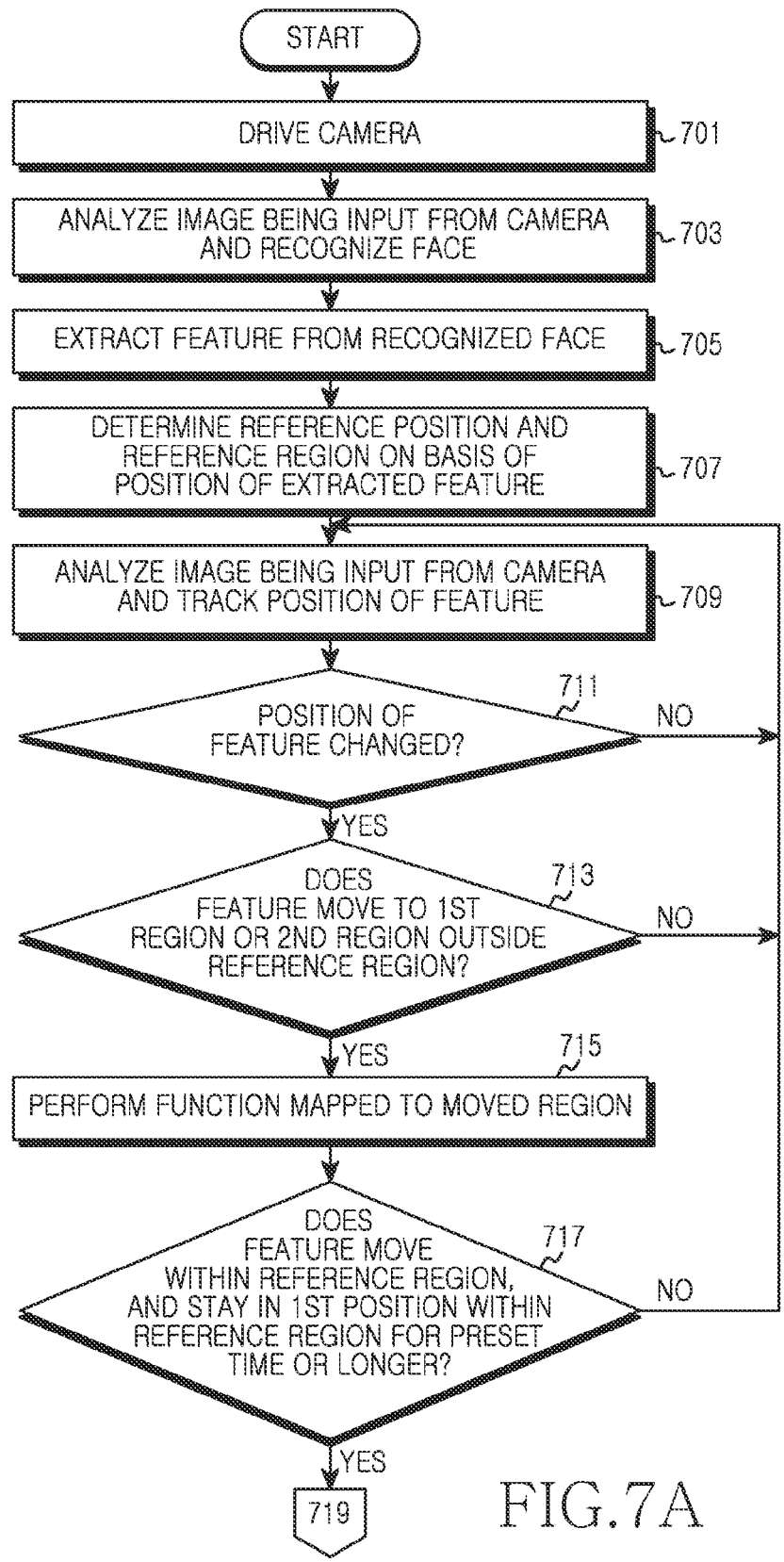
FIGS. 7A and 7B are flowcharts illustrating a procedure of changing a reference position on a basis of a movement direction of a feature in an electronic device according to an embodiment of the present disclosure.
Figure 7B:
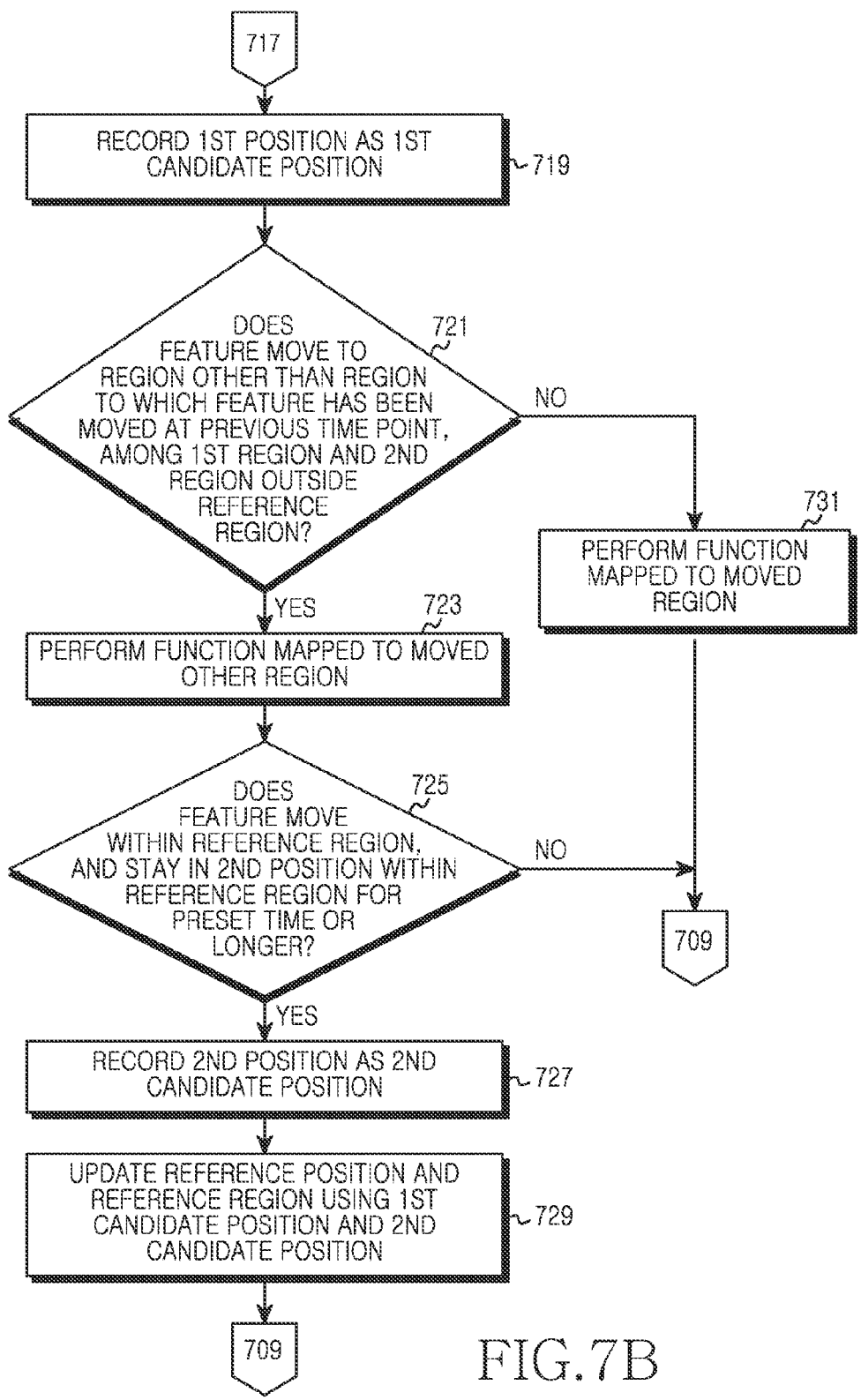

FIGS. 7A and 7B are flowcharts illustrating a procedure of changing a reference position on a basis of a movement direction of a feature in an electronic device according to an embodiment of the present disclosure.

Referring to FIG. 7, at operation 701, the electronic device drives a camera. The camera may be driven automatically when an event for controlling the electronic device using a feature occurs.

At operation 703, the electronic device analyzes an image being input from the camera and recognizes a user face.

At operation 705, the electronic device extracts a feature from the recognized user face. The feature may be one of constituent elements identifiable within the user face, such as a face form, the eyes, the eyeballs, the pupils, the nose, the mouth, the eyebrows, and the like.

At operation 707, the electronic device determines a reference position and a reference region on the basis of a position of the extracted feature. For example, as illustrated in FIG. 2B, the electronic device may extract the eye from the user face to determine as a reference position 210 a position in which the eye is extracted and determine as a reference region 212 a region within a threshold distance from the reference position 210. Although FIGS. 2A and 2B illustrate that the user face is displayed on the touch screen 140 of the electronic device, such an illustration is for description convenience, and according to various embodiments of the present disclosure, when performing a process of setting the reference position 210 and the reference region 212, the electronic device may display an execution screen (e.g., a web browser execution screen, or the like) of an application being used by a user, instead of displaying the user face, on the touch screen 140.

At operation 709, the electronic device analyzes an image being input from the camera and tracks a position of the feature.

At operation 711, the electronic device determines whether a position of the feature has changed. For example, the electronic device analyzes an image being input in real-time from the camera to confirm a position of the feature, and determines whether the confirmed position of the feature is the same as the reference position.

If the confirmed position of the feature is not the same as the reference position, the electronic device may determine that the position of the feature has changed. If the electronic device determines that the position of the feature has not changed at operation 711, then the electronic device returns to operation 709 and again performs the subsequent operations. Although not illustrated in the drawings, the operation of analyzing the image being input from the camera in real-time and tracking the position of the feature may be continuously performed in operations described later.

In contrast, if the electronic device determines that the position of the feature has changed at operation 711, then the electronic device proceeds to operation 713 at which the electronic device determines whether the feature is moved to a 1st region or a 2nd region outside the reference region. For example, assuming that an upper region is a 1st region 300 and a lower region is a 2nd region 302 on a basis of a reference region 212 as illustrated in FIG. 3A, the electronic device determines whether the feature is moved to the 1st region 300 or the 2nd region 302. If the feature exists within the reference region 212 without moving to the 1st region 300 or the 2nd region 302, the electronic device returns to operation 709 and again performs the subsequent operations. If the feature is determined to have moved within the reference region, the electronic device may determine that the movement of the feature results from user's unintentional hand-tremor, tilting, or movement and thus, may determine that the feature is not moved.

In contrast, if the electronic device determines the feature has been moved to the 1st region 300 or the 2nd region 302 at operation 713, then the electronic device proceeds to operation 715 at which the electronic device performs a function mapped to the moved region. For example, if a user's eye 310 is located in a 1st region 300 as illustrated in FIG. 3A, the electronic device may perform scrolling-up that is a function corresponding to the 1st region 300.

Thereafter, the electronic device proceeds to operation 717 at which the electronic determines whether the feature is moved within the reference region and stays in a 1st position within the reference region for a preset time or longer. For example, as a result of continuously analyzing an image being input in real-time, the electronic device determines whether a user's eye 310 is located in the 1st region 300 as illustrated in FIG. 3A and then a user's eye 312 returns to the reference region 212 and stays in an arbitrary position within the reference region 212 for a preset time or longer as illustrated in FIG. 3B.

If the electronic device determines that the feature is moved within the reference region but does not stay in the 1st position within the reference region for the preset time or longer at operation 717, then the electronic device returns to operation 709 and again performs the subsequent operations.

In contrast, if the electronic device determines that the feature is moved within the reference region and then stays in the 1st position within the reference region for the preset time or longer at operation 717, the electronic device proceeds to operation 719 and records the 1st position as a 1st candidate position. The candidate position signifies a position to be used for updating the reference position.

At operation 721, the electronic device determines whether the feature is moved to a region other than a region to which the feature has been moved at a previous time point, among the 1st region and the 2nd region outside the reference region. For example, the electronic device determines whether the feature is moved to the other region, not the region in which the feature has been located at operation 715.

If the electronic device determines that the feature is not moved to the other region at operation 721, for example, if the feature is again moved to the region to which the feature has been moved at the previous time point, then the electronic device proceeds to operation 731 at which the electronic device again performs the function mapped to the moved region and then, returns to operation 709 and again performs the subsequent operations.

In contrast, if the electronic device determines that the feature is moved to the other region at operation 721, for example, if the feature is moved to the other region, not the region to which the feature has been moved at the previous time point, then the electronic device proceeds to operation 723 at which the electronic device performs a function mapped to the moved other region.

At operation 725, the electronic device determines whether the feature is moved within the reference region and stays in a 2nd position within the reference region for a preset time or longer. The 1st position and the 2nd position, which are arbitrary positions within the reference region, may be the same position or may be different positions.

If the electronic device determines that the feature is moved within the reference region but does not stay in the 2nd position within the reference region for the preset time or longer at operation 725, then the electronic device returns to operation 709 and again performs the subsequent operations.

In contrast, if the electronic device determines that the feature is moved within the reference region and stays in the 2nd position within the reference region for the preset time or longer at operation 725, then the electronic device proceeds to operation 727 at which the electronic device records the 2nd position as a 2nd candidate position.

Thereafter, at operation 729, the electronic device updates the reference position using the 1st candidate position and the 2nd candidate position, and updates the reference region on the basis of the updated reference position. For example, as illustrated in FIG. 4C, after determining a reference position 401 and a reference region 403, the electronic device may track a moved position of a feature and, when detecting that the feature moves to a lower region outside the reference region 403, returns to the reference region 403, and stays in a 1st position 431 for a predetermined time or longer and then moves to an upper region outside the reference region 403, returns to the reference region 403, and stays in a 2nd position 433 for a predetermined time or longer, the electronic device may change the reference position 401 into a reference position 405 that is an average value of the 1st and 2nd positions 431 and 433 in which the feature stays for the predetermined time or longer. According to various embodiments of the present disclosure, although not illustrated, the reference region 403 may be changed according to the changed reference position 405. According to various embodiments of the present disclosure, detecting that the feature moves alternatively to the regions located in the different directions and changing the reference position is for preventing the reference position from being biased in one direction owing to the repeated change of the reference position.

Thereafter, the electronic device returns to operation 709 and again performs the subsequent operations.

Figure 8:
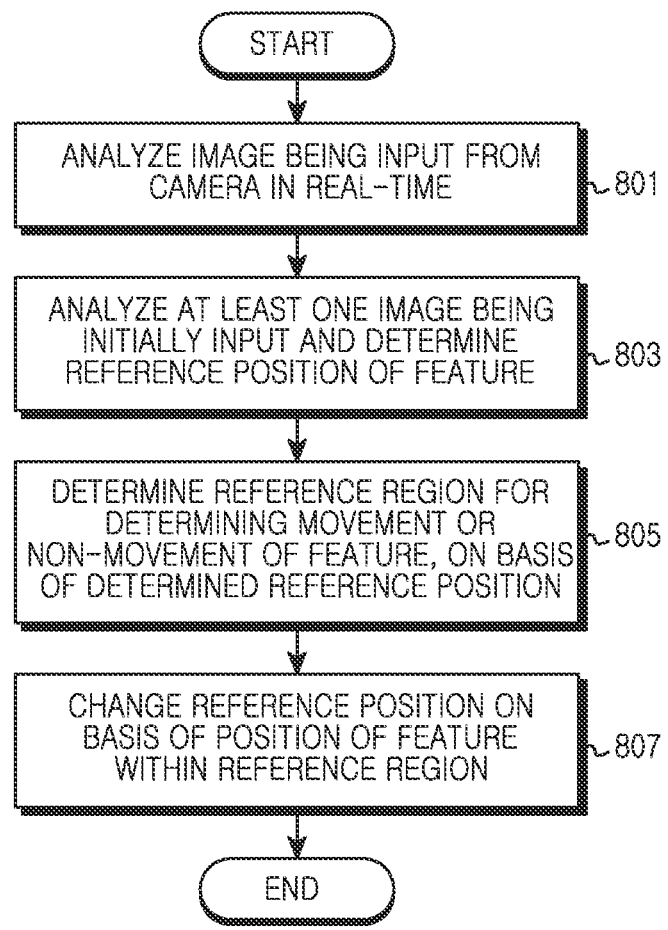
FIG. 8 is a flowchart illustrating a procedure of changing a reference position in an electronic device according to an embodiment of the present disclosure.

FIG. 8 illustrates a procedure of changing a reference position in an electronic device according to an embodiment of the present disclosure.

Referring to FIG. 8, at operation 801, the electronic device analyzes an image being input from a camera in real-time.

At operation 803, the electronic device analyzes at least one image being initially input and determines a reference position of a feature. For example, when an event for controlling the electronic device using a feature occurs, the electronic device may extract a position of the feature from an 'N' number of images being input, and determine a reference position of the feature on the basis of the position of the feature extracted from each of the 'N' number of images.

At operation 805, the electronic device determines a reference region for determining the movement or non-movement of the feature on the basis of the determined reference position. The reference region, which is a region including the reference position, may be determined a region within a threshold distance from the reference position.

At operation 807, the electronic device changes the reference position on the basis of a position of the feature within the reference region. For example, while analyzing the image in real-time and tracking a position change of the feature, the electronic device may change the reference position on the basis of a position to which the feature is moved within the reference region. At this time, the electronic device may change the reference region on the basis of the changed reference position.

As described above, various embodiments of the present disclosure recognize a feature in a face being input from a camera, determine the original reference position, and update the reference position according to a position change of the feature. By doing so, when a user fails to accurately recognize the original reference position and thus the feature fails to come back to the accurate original reference position, various embodiments of the present disclosure change the reference position into a corresponding position, thereby being capable of preventing the occurrence of an erroneous operation in an electronic device. In addition, there is an effect of being capable of, even when a user catching the electronic device with a hand conducts unintentional slight hand-tremor, tilting, and movement, decreasing a probability in which the change of the reference position brings about the erroneous operation.

Various embodiments of the present disclosure may be implemented in a hardware form, a software form, or a combination form of hardware and software. Software can be stored in a volatile storage medium or a non-volatile storage medium. As the storage medium, there are a storage device such as a Read Only Memory (ROM), a memory device such as a Random Access Memory (RAM), a memory chip, or an integrated circuit, an optical or magnetic recording medium such as a Compact Disk (CD), a Digital Versatile Disk (DVD), a magnetic disk, or a magnetic tape, and the like. The storage device or storage medium is a storage means which can read a machine language, suitable for storing a program including instructions of implementing the present disclosure. According to various embodiments of the present disclosure, the storage device or storage medium may be a non-transitory computer-readable storage medium. Accordingly, the embodiments of the present disclosure provide a program including a code implementing an apparatus or method disclosed in claims of the present disclosure. According to various embodiments of the present disclosure, the programs may be distributed through a wireless or wired communication network, and may be stored and executed through a distribution scheme.

The term of "comprises" and a deformation form thereof being the term of "comprising", described in the disclosure and claims of the specification, have a meaning of "comprising but not being limited to" and do not exclude other additional constructions, components, processes, or the like.

The singular number described in the disclosure and claims of the specification includes the plural number so long as the plural number is not described as being particularly concretely excluded. Particularly, an indefinite article is understood as including the singular number and the plural number.

A form, a number, a feature, a group and the like described regarding a concrete embodiment of the present disclosure are, unless being incompatible, available even in other embodiments of the present disclosure.

Through the disclosure and claims of the specification, the term of "X for Y" ('Y' denotes an action or process, and 'X' denotes a means for performing such the action or process) includes 'X' concretely arranged or applied to perform 'Y', but is not limited to this.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    acquiring images in real-time using a camera;
    determining a reference position based on a position of a feature within at least one image among the images being input;
    determining a reference region for determining whether the feature is moved, based on the determined reference position, the reference region being a region within a threshold distance from the determined reference position; and
    changing the determined reference position according to a position of the feature moved within the reference region.

2. The method of claim 1, wherein the changing of the determined reference position comprises:
    counting a preset time;

after the preset time expires, determining whether the position of the feature within the at least one image among the images being input in real-time is comprised within the reference region; and if the position of the feature is determined to be comprised within the reference region, changing the determined reference position into the position of the feature comprised within the reference region.

3. The method of claim 1, wherein the changing of the determined reference position comprises:

counting a preset time;

during the preset time, tracking the position of the feature within the at least one image among the images being input in real-time; and changing the determined reference position based on positions comprised within the reference region among the tracked positions of the feature.

4. The method of claim 3, wherein the changing of the determined reference position based on the positions comprised within the reference region among the tracked positions of the feature comprises:

determining as a candidate position a position in which the feature stays within the reference region for a threshold time or longer among the tracked positions of the feature; and changing the determined reference position using the determined at least one candidate position.

5. The method of claim 1, wherein the changing of the determined reference position comprises:

during a preset time, tracking the position of the feature within the at least one image among the images being input in real-time;

confirming a count in which the feature moves to a region outside the reference region and returns to the reference region;

comparing the comeback count and a threshold count; and if the comeback count and the threshold count are equal to each other, changing the determined reference position based on positions comprised within the reference region among the tracked positions of the feature.

6. The method of claim 5, wherein the changing of the determined reference position on the basis of the positions comprised within the reference region among the tracked positions of the feature comprises:

determining as a candidate position a position in which the feature returns to the reference region and then stays in the reference region during a threshold time; and changing the determined reference position using the determined at least one candidate position.

7. The method of claim 1, wherein the changing of the determined reference position comprises:

during a preset time, tracking the position of the feature within the at least one image among the images being input in real-time;

confirming a moved region of the feature based on the tracked position of the feature;

determining whether the moved region of the feature satisfies a preset condition; and when the moved region of the feature is determined to satisfy the preset condition, changing the determined reference position on the basis of positions comprised within the reference region among the tracked positions of the feature.

8. The method of claim 7, wherein the determining of whether the moved region of the feature satisfies the preset condition comprises:

determining whether the feature is moved at least once to different regions, which are located in different directions with respect to the reference region, based on the moved region of the feature.

9. The method of claim 1, wherein the feature is any one of a face form, eyes, an eyeball, a pupil, a nose, a mouth, and eyebrows.

10. The method of claim 1, further comprising:

determining whether the feature is moved to a region outside the reference region; and if the feature is determined to have moved to the region outside the reference region, performing a function previously mapped to the region to which the feature has been moved.

11. An electronic device comprising:

at least one processor configured to execute computer programs;

a camera configured to capture images;

a memory configured to store data and instructions; and a program stored in the memory and configured to be executable by the at least one processor, wherein the program comprises an instruction of:

acquiring images in real-time using a camera, determining a reference position based on a position of a feature within at least one image among the images being input, determining a reference region for determining whether the feature is moved, based on the determined reference position, the reference region being a region within a threshold distance from the determined reference position, and changing the determined reference position according to a position of the feature moved within the reference region.

12. The electronic device of claim 11, wherein the program further comprises an instruction of:

counting a preset time, after the preset time expires, determining whether the position of the feature within the image among the images being input in real-time is comprised within the reference region, and if the position of the feature is determined to be comprised within the reference region, changing the determined reference position into the position of the feature comprised within the reference region.

13. The electronic device of claim 11, wherein the program further comprises:

counting a preset time, during the preset time, tracking the position of the feature within the image among the images being input in real-time, and changing the determined reference position based on positions comprised within the reference region among the tracked positions of the feature.

14. The electronic device of claim 13, wherein the program further comprises an instruction of:

determining as a candidate position a position in which the feature stays within the reference region for a threshold time or longer among the tracked positions of the feature, and changing the determined reference position using the determined at least one candidate position.

15. The electronic device of claim 11, wherein the program further comprises an instruction of:

during a preset time, tracking the position of the feature within the image among the images being input in real-time, confirming a count in which the feature moves to a region outside the reference region and returns to the reference region, comparing the comeback count and a threshold count, and if the comeback count and the threshold count are equal to each other, changing the determined reference position based on positions comprised within the reference region among the tracked positions of the feature.

16. The electronic device of claim 15, wherein the program further comprises an instruction of:

determining as a candidate position a position in which the feature returns to the reference region and then stays in the reference region during a threshold time, and changing the determined reference position using the determined at least one candidate position.

17. The electronic device of claim 11, wherein the program further comprises an instruction of:

during a preset time, tracking the position of the feature within the image among the images being input in real-time, confirming a moved region of the feature based on the tracked position of the feature, determining whether the moved region of the feature satisfies a preset condition, and when the moved region of the feature is determined to satisfy the preset condition, changing the determined reference position on the basis of positions comprised within the reference region among the tracked positions of the feature.

18. The electronic device of claim 17, wherein the program further comprises an instruction of determining whether the feature is moved at least once to different regions, which are located in different directions with respect to the reference region, based on the moved region of the feature.

19. The electronic device of claim 11, wherein the feature is any one of a face form, eyes, an eyeball, a pupil, a nose, a mouth, and eyebrows.

20. The electronic device of claim 11, wherein the program further comprises an instruction of:

determining whether the feature is moved to a region outside the reference region, and if the feature is determined to have moved to the region outside the reference region, performing a function previously mapped to the region to which the feature has been moved.

21. A non-transitory computer readable storage medium storing instructions that, when executed, cause at least one processor to perform the method of claim 1.

* * * * *